G. E. McKINNON.
CUSHIONED HORSESHOE.
APPLICATION FILED MAR. 4, 1911.

1,042,943.

Patented Oct. 29, 1912.

WITNESSES:
G. Robert Thomas
Wm. F. Nickel

INVENTOR
George E. McKinnon
BY Munn & Co.
ATTORNEYS

UNITED STATES PATENT OFFICE.

GEORGE ERVING McKINNON, OF LITTLE FALLS, NEW JERSEY.

CUSHIONED HORSESHOE.

1,042,943.  Specification of Letters Patent.  Patented Oct. 29, 1912.

Application filed March 4, 1911. Serial No. 612,204.

*To all whom it may concern:*

Be it known that I, GEORGE ERVING MC-KINNON, a citizen of the United States, and a resident of Little Falls, in the county of Passaic and State of New Jersey, have invented a new and Improved Cushioned Horseshoe, of which the following is a full, clear, and exact description.

My invention relates to horseshoes, and it comprises means for cushioning the footfall of the animal wearing the same. This end I attain by detachably securing to the under side of the shoe a strip of rubber or other suitable material, which forms a resilient tread for the shoe.

Reference is to be had to the accompanying drawings forming a part of this specification, in which the same characters of reference indicate the same parts in all the views.

Figure 1:
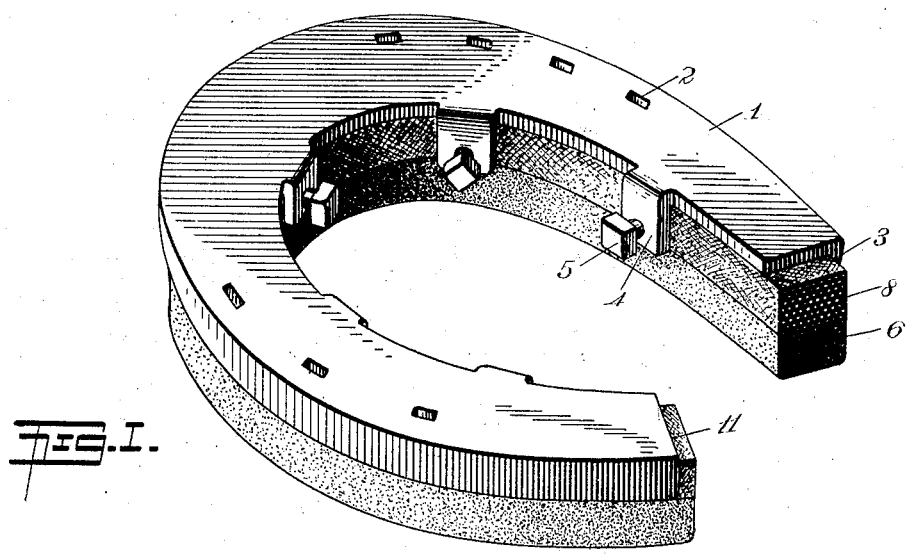
Figure 2:
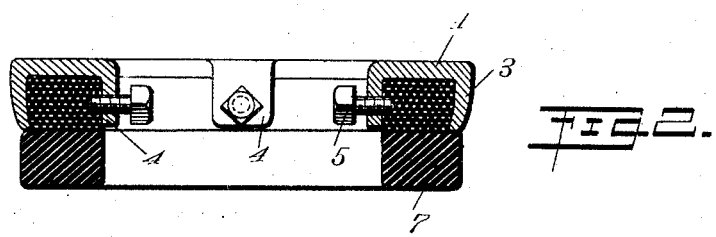
Figure 4:
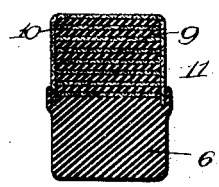
Figure 3:
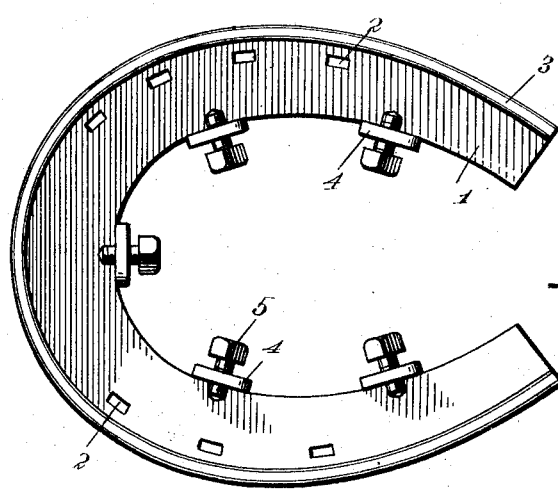

Figure 1 is a perspective view of my improved horseshoe; Fig. 2 is a transverse vertical section thereof; Fig. 3 is a bottom plan of the shoe itself, with the resilient tread removed; and Fig. 4 is a cross-sectional view of the resilient tread or cushion.

My horseshoe comprises a body 1, made of a flat strip of metal bent into proper shape, and having holes 2 therein to receive the horseshoe nails, by means of which the shoe is secured to the foot of the animal wearing the same. The outer edge of the horseshoe is bent downward, forming a rim or flange 3; and along the inner edge of the shoe are formed at suitable intervals a number of lugs 4, having threaded perforations to receive the headed bolts 5.

The resilient tread of the shoe is indicated at 6, and this tread is held in place on the under side of the shoe by means of the flanges 3 and the bolts 5. The bolts 5 are of course screwed in until they hold the tread 6 tightly in place. The rubber tread 6 extends entirely around the shoe from one end to the other. The rubber tread 6 is made up of a lower section 7, consisting entirely of rubber, and an upper section 8. This upper section is formed of alternate layers of rubber 9 and canvas 10, and on the top thereof is a cap 11, of canvas or other stout cloth, the sides of which extend down below the top of the section 7, and are suitably secured thereto. This holds the two sections 7 and 8 together, and at the same time makes the upper section sufficiently strong to resist wear; in other words, the layers of canvas or coarse cloth reinforce the tread throughout the upper half, and by this construction the bolts 5 are prevented from piercing or cutting the tread, as they could not fail to do if the same were made of rubber throughout.

By means of a horseshoe constructed as described above, the footfall of the animal wearing the same is cushioned, with the result that the animal is fatigued much less by the day's work than is the case with the ordinary metal shoes now in use. Whenever the tread 6 is worn out, it can be detached by loosening the bolts 5, and another tread substituted. In this way the body of the shoe is never worn out, and the labor of reshoeing the animal, by removing the nails from the hoof and taking off the shoe entirely, is saved.

Having thus described my invention, I claim as new and desire to secure by Letters Patent:

A tread for cushioning horseshoes, comprising a lower section made of resilient material, and an upper section comprising alternate layers of resilient material and reinforcing material, and a cap for the top of the upper layer, said cap consisting of reinforcing material and extending downward over the sides of the upper section, and attached along its lower edges to the top of the lower section to hold the two sections together.

In testimony whereof I have signed my name to this specification in the presence of two subscribing witnesses.

GEORGE ERVING McKINNON.

Witnesses:
 WILLIAM FRANCIS LOONEY,
 HENRY IRVING HALL.

---

Copies of this patent may be obtained for five cents each, by addressing the "Commissioner of Patents, Washington, D. C."